(12) United States Patent
Mannava et al.

(10) Patent No.: US 10,970,225 B1
(45) Date of Patent: Apr. 6, 2021

(54) APPARATUS AND METHOD FOR HANDLING CACHE MAINTENANCE OPERATIONS

(71) Applicant: Arm Limited, Cambridge (GB)

(72) Inventors: Phanindra Kumar Mannava, Austin, TX (US); Bruce James Mathewson, Papworth Everard (GB); Jamshed Jalal, Austin, TX (US)

(73) Assignee: Arm Limited, Cambridge (GB)

( * ) Notice: Subject to any disclaimer, the term of this patent is extended or adjusted under 35 U.S.C. 154(b) by 12 days.

(21) Appl. No.: 16/591,827

(22) Filed: Oct. 3, 2019

(51) Int. Cl.
*G06F 12/0897* (2016.01)
*G06F 12/0868* (2016.01)
*G06F 12/0871* (2016.01)
*G06F 3/06* (2006.01)

(52) U.S. Cl.
CPC ........ *G06F 12/0897* (2013.01); *G06F 3/0637* (2013.01); *G06F 12/0868* (2013.01); *G06F 12/0871* (2013.01)

(58) Field of Classification Search
CPC ............. G06F 12/0897; G06F 12/0811; G06F 12/0871; G06F 12/0868; G06F 12/0862; G06F 3/0637; G06F 3/0685; G06F 3/0653

See application file for complete search history.

(56) References Cited

U.S. PATENT DOCUMENTS

2014/0297965 A1* 10/2014 Jayaseelan .............. G06F 9/528
711/137

* cited by examiner

*Primary Examiner* — Ernest Unelus
(74) *Attorney, Agent, or Firm* — Nixon & Vanderhye P.C.

(57) ABSTRACT

An apparatus and method are provided for handling cache maintenance operations. The apparatus has a plurality of requester elements for issuing requests and at least one completer element for processing such requests. A cache hierarchy is provided having a plurality of levels of cache to store cached copies of data associated with addresses in memory. A requester element may be arranged to issue a cache maintenance operation request specifying a memory address range in order to cause a block of data associated with the specified memory address range to be pushed through at least one level of the cache hierarchy to a determined visibility point in order to make that block of data visible to one or more other requester elements. The given requester element may be arranged to detect when there is a need to issue a write request prior to the cache maintenance operation request in order to cause a write operation to be performed in respect of data within the specified memory address range, and in that event to generate a combined write and cache maintenance operation request to be issued instead of the write request and a subsequent cache maintenance operation request. A recipient completer element that receives the combined write and cache maintenance operation request may then be arranged to initiate processing of the cache maintenance operation required by the combined write and cache maintenance operation request without waiting for the write operation to complete. This can significantly reduce latency in the handling of cache maintenance operations, and can provide for reduced bandwidth utilisation.

21 Claims, 9 Drawing Sheets

VARIATIONS IN USE OF COMBINED WRITE + CMO REQUEST

|        | MASTER TO INTERCONNECT                    | INTERCONNECT TO SLAVE                                          |
|--------|-------------------------------------------|----------------------------------------------------------------|
| CASE 1 | COMBINED WRITE + CMO REQUEST              | COMBINED WRITE + CMO REQUEST                                   |
| CASE 2 | COMBINED WRITE + CMO REQUEST              | SEPARATE WRITE REQUEST AND SEPARATE CMO REQUEST                |
| CASE 3 | COMBINED WRITE + CMO REQUEST              | ONLY WRITE REQUEST (NO NEED TO PROPAGATE CMO BEYOND INTERCONNECT) |
| CASE 4 | CMO REQUEST (NO WRITE REQUEST)            | COMBINED WRITE + CMO REQUEST                                   |

FIG. 7

APPARATUS AND METHOD FOR HANDLING CACHE MAINTENANCE OPERATIONS

BACKGROUND

The present technique relates to an apparatus and method for handling cache maintenance operations.

An apparatus may comprise multiple elements that can each issue requests to access data, those requests typically specifying a memory address to identify where within memory that data is stored or is to be stored. In order to improve access times, it is known to provide a cache hierarchy comprises a plurality of levels of cache that are used to store cached copies of data associated with addresses in memory. Some of the caches in the cache hierarchy may be local caches associated with particular elements, whilst others may be shared caches that are accessible to multiple elements.

It is often the case that data written by one element needs to be made visible to at least one other element within the apparatus. One way to seek to achieve this is to use a cache maintenance operation, which may for example be used to evict data that has been written into the cache but is more up to date than the data held in memory, so that that write data is then pushed down to the next level in the cache hierarchy. By passing the cache maintenance operation request onto one or more levels of cache in the cache hierarchy, this can be used to push previous write data to a desired visibility point within the apparatus. The cache maintenance operation may typically specify a memory address range in respect of which that operation is to be performed, and the determined visibility point may depend on the memory address range in question, and the particular elements that need to have visibility of the data.

However, there can be significant latency involved in processing a cache maintenance operation used to push write data to the desired visibility point. In particular, each time it is determined when handling the cache maintenance operation that there is a pending write to an address within the specified address range of the cache maintenance operation, or where it is determined that data in a cache being subjected to the cache maintenance operation needs to be written out to a lower level of the cache hierarchy or memory, then in accordance with known techniques the further handling of the cache maintenance operation needs to wait until that earlier write operation has completed before the cache maintenance operation can then proceed.

It would be desirable to reduce the latency associated with the handling of cache maintenance operations.

SUMMARY

In one example arrangement, there is provided an apparatus comprising: a plurality of requester elements to issue requests; at least one completer element to process the requests; a cache hierarchy comprising a plurality of levels of cache to store cached copies of data associated with addresses in memory; wherein: a given requester element in the plurality of requester elements is arranged to issue a cache maintenance operation request specifying a memory address range in order to cause a block of data associated with the specified memory address range to be pushed through at least one level of the cache hierarchy to a determined visibility point in order to make that block of data visible to one or more other requester elements in the plurality of requester elements; the given requester element is responsive to detection of a need to issue a write request prior to the cache maintenance operation request in order to cause a write operation to be performed in respect of an item of data within the specified memory address range, to generate a combined write and cache maintenance operation request to be issued instead of the write request and subsequent cache maintenance operation request; wherein a recipient completer element amongst the at least one completer element that receives the combined write and cache maintenance operation request is arranged to initiate processing of a cache maintenance operation required by the combined write and cache maintenance operation request without waiting for the write operation to complete.

In another example arrangement, there is provided a method of handling cache maintenance operations within an apparatus, comprising: providing a plurality of requester elements to issue requests, at least one completer element to process the requests, and a cache hierarchy comprising a plurality of levels of cache to store cached copies of data associated with addresses in memory; arranging a given requester element to issue a cache maintenance operation request specifying a memory address range in order to cause a block of data associated with the specified memory address range to be pushed through at least one level of the cache hierarchy to a determined visibility point in order to make that block of data visible to one or more other requester elements in the plurality of requester elements; in response to detecting a need to issue a write request prior to the cache maintenance operation request in order to cause a write operation to be performed in respect of an item of data within the specified memory address range, generating at the given requester element a combined write and cache maintenance operation request to be issued instead of the write request and subsequent cache maintenance operation request; and causing a recipient completer element amongst the at least one completer element that receives the combined write and cache maintenance operation request to initiate processing of a cache maintenance operation required by the combined write and cache maintenance operation request without waiting for the write operation to complete.

In a still further example arrangement, there is provided an apparatus comprising: a plurality of requester element means for issuing requests; at least one completer element means for processing the requests; a cache hierarchy comprising a plurality of levels of cache means for storing cached copies of data associated with addresses in memory; wherein: a given requester element means in the plurality of requester element means is arranged to issue a cache maintenance operation request specifying a memory address range in order to cause a block of data associated with the specified memory address range to be pushed through at least one level of the cache hierarchy to a determined visibility point in order to make that block of data visible to one or more other requester element means in the plurality of requester element means; the given requester element means, responsive to detection of a need to issue a write request prior to the cache maintenance operation request in order to cause a write operation to be performed in respect of an item of data within the specified memory address range, for generating a combined write and cache maintenance operation request to be issued instead of the write request and subsequent cache maintenance operation request; wherein a recipient completer element means amongst the at least one completer element means that receives the combined write and cache maintenance operation request is arranged to initiate processing of a cache maintenance operation required by the combined write and cache maintenance operation request without waiting for the write operation to complete.

BRIEF DESCRIPTION OF THE DRAWINGS

The present technique will be described further, by way of illustration only, with reference to examples thereof as illustrated in the accompanying drawings, in which:

FIG. 7 is a table illustrating various cases where the combined write and cache maintenance operation request described herein may be used in one or both of the communications between the master and the interconnect and the interconnect and the slave, in accordance with one example implementation;

DESCRIPTION OF EXAMPLES

Figure 1:
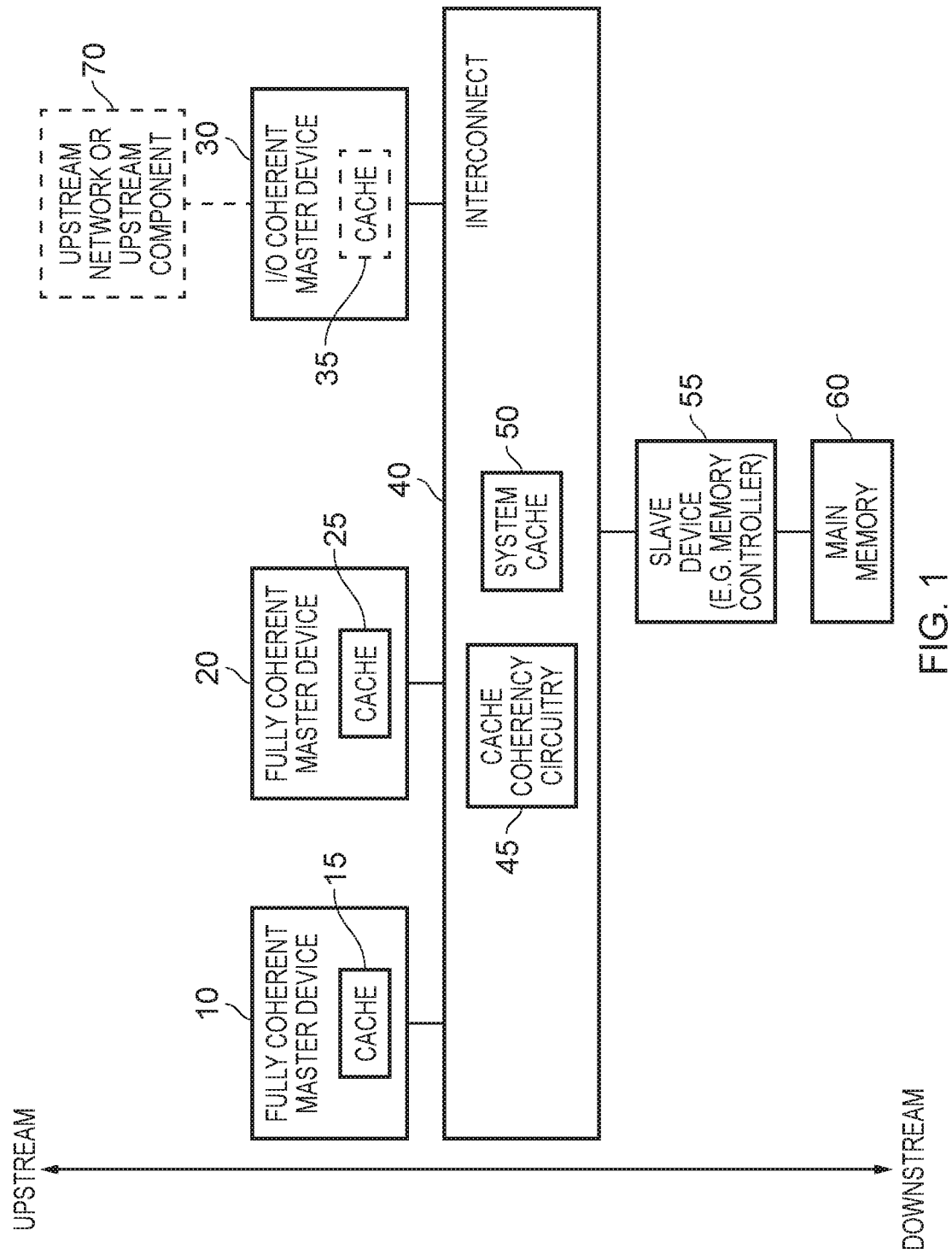
FIG. 1 is a block diagram of an apparatus in accordance with one example implementation.

In accordance with the techniques described herein, an apparatus is provided that has a plurality of requester elements that may issue requests, and at least one completer element that is used to process such requests. The requester elements can take a variety of forms, dependent on the implementation. They may for example take the form of master devices that issue access requests to memory, or indeed can be intermediate elements at an intermediate location within the apparatus, for example within an interconnect used to provide connections between a number of master devices and one or more slave devices. Such intermediate elements may both act as a completer element to process a request from a master device, but also as a requester element to issue requests to further downstream elements within the system (a downstream element being an element that is closer to memory than the requester element in question). Similarly, the completer elements can take a variety of forms. They can for example be a slave device used to process access requests issued from an upstream element, an example of such a slave device being a memory controller that is used to control access to memory. However, as discussed above, the completer element may also be an intermediate element within the apparatus, for example residing within the interconnect used to provide a connection between one or more master devices and one or more slave devices.

The apparatus also provides a cache hierarchy comprising a plurality of levels of cache that are used to store cached copies of data associated with addresses in memory.

One or more of the requester elements may be able to issue cache maintenance operation (CMO) requests that specify a memory address range, and are used to cause a block of data associated with the specified memory address range to be pushed through at least one level of the cache hierarchy to a determined visibility point in order to make that block of data visible to one or more other requester elements in the plurality of requester elements. The determined visibility point may depend on the memory type of the memory specified by the memory address range, and an understanding of the requester elements that need to have visibility of the data within that memory address range. Whilst in principle the determined visibility point could be specified directly by the cache maintenance operation request, in one example implementation that visibility point is determined based on system knowledge of the memory type and the requester elements that need to have visibility of the data, and hence the determined visibility point may vary for different cache maintenance operation requests.

Whilst the memory address range specified by the cache maintenance operation request may vary dependent on implementation, it may for example be a memory address range sufficient to identify, as the block of data, a cache line's worth of data that will be stored within a cache line of a cache. Hence, performance of the cache maintenance operation in respect of a particular cache may involve performing a lookup to determine whether the block of data identified by the memory address range is stored within the cache, and if so then performing a cache maintenance operation in respect of the identified cache line. This may for example cause any data in that cache line which is more up to date than the copy held in memory to be evicted from the cache. Often, in such a situation, the cache line of data is evicted, and hence will be propagated onto a lower level in the cache hierarchy or to memory. During the eviction process a clean copy of the data may be retained in the cache, or alternatively no copy of the data may be left in the cache (for example by invalidating the cache line). The term "eviction" will be used herein to cover situations where data in a given level of cache is pushed from that given level of cache to a lower level in the cache hierarchy or to memory, irrespective of whether a clean copy is retained in the cache or not.

The cache maintenance operation request itself may then be propagated on so that the same cache maintenance operation can be performed at any further intervening levels of cache until the determined visibility point is reached. The determined visibility point may itself be a level of cache, or may alternatively be a location within the system beyond the final level of cache in the cache hierarchy, for example buffers within a memory controller or indeed memory itself.

In accordance with the techniques described herein, a given requester element that is able to issue such cache maintenance operation requests can be arranged to detect when there is a need to issue a write request prior to the cache maintenance operation request in order to cause a write operation to be performed in respect of an item of data within the specified memory address range, and in such a situation may be arranged to generate a combined write and cache maintenance operation request to be issued instead of the write request and subsequent cache maintenance operation requests. There are various situations in which it may be determined necessary to initiate a write operation before a cache maintenance operation request can then be issued. Typically, this has necessitated the need to issue a write request, and then defer issuance of the cache maintenance operation request until a completion signal is received for the write request. However, in accordance with the techniques described herein, this potential latency impact on the handling of the cache maintenance operation is alleviated by allowing the given requester element to generate a combined write and cache maintenance operation request, and as a result there is no delay in issuing the cache maintenance operation request.

Depending on the condition giving rise to the need to perform a write operation, the item of data to be written may be a subset of the data in the memory address range specified for the cache maintenance operation, or all of the data in that specified memory address range.

A recipient completer element that receives the combined write and cache maintenance operation request can be arranged to initiate processing of a cache maintenance operation required by the combined write and cache maintenance operation request without waiting for the write operation to complete. In particular, the recipient completer element can be arranged so that it can begin to process the required cache maintenance operation whilst the write operation is still in progress. For instance, the recipient completer element can initiate performance of the required cache maintenance operation in respect of an identified cache line of a cache local to the recipient completer element before the write data associated with the write operation has been received and processed by the completer element. Indeed, it may be possible for the recipient completer element to undertake all necessary actions in respect of the local cache line being subjected to the cache maintenance operation, with the subsequent handling of the write data then being constrained to ensure that write data is not written into the cache line being subjected to the cache maintenance operation in a way that is inconsistent with the cache maintenance operation. A cache maintenance operation completion response may hence in fact be issued before the data associated with the write operation has been processed by the recipient completer element. Similarly, the recipient completer element can issue a write completion response for the write operation before it has received the write data, and in particular can do this once it has set up any hazard checks required to ensure that a subsequently received request specifying the same address as that associated with the write operation will be arranged to access the write data associated with the write operation.

Hence, it has been found that the processing of the write and the cache maintenance operation can typically proceed in parallel, and it is often the case that the completion signal for the write operation and the completion signal for the cache maintenance operation can be issued relatively close in time to each other. In any event, since the recipient completer element can initiate processing of the cache maintenance operation without waiting for the write operation to complete, this avoids the requirement to serialise the requests at the requester element, and in particular avoids the need for the requester element to defer issuing the cache maintenance operation request until the write completion signal is received. Hence, even if there is a requirement for some delay at the recipient completer element before the completion signal for the cache maintenance operation can be issued, there will be a significantly reduced latency compared with a situation where the cache maintenance operation request was not even issued by the requester element until the preceding write operation had completed.

As a further benefit, the use of the combined write and cache maintenance operation request reduces bandwidth utilisation in the path provided between the requester element and the completer element, since a single request signal can be issued, rather than two separate requests at two different points in time. This can also yield further bandwidth utilisation benefits when processing the response signals issued in respect of the write operation and the cache maintenance operation, as a result of the ability to process those two operations in parallel. In particular, it may be possible to combine not only certain response signals issued for the write operation and/or certain response signals issued for the cache maintenance operation, but indeed to combine certain response signals issued for both the write operation and the cache maintenance operation in some situations, hence producing combined write and CMO responses.

It should further be noted that the use of the combined write and cache maintenance operation request still enables the underlying features of write operation and the cache maintenance operations to be preserved, in that the recipient completer element can still process the write operation and the cache maintenance operation in the standard manner, but through use of the techniques described herein is able to initiate performance of the cache maintenance operation much sooner than would otherwise have been possible when using serialised separate requests issued by the requester element.

In one example implementation, the recipient completer element is arranged to issue a completion signal when processing a request specifying a memory address, to indicate that sufficient steps have been taken by the recipient completer element to ensure that an outcome of an operation required by that request will be observed by at least a subset of the plurality of requester elements that issue a subsequent request specifying that memory address to the recipient completer element. The recipient completer element is arranged to issue to the given requester element a write completion signal and a separate cache maintenance operation completion signal, to enable the given requester element to independently be appraised of progress of the write operation and the cache maintenance operation required by the combined write and cache maintenance operation request. In some instances, it may be that the outcome of the operation required by the request needs to be observed by all of the requester elements, but in other instances not all of the requester elements may need to observe the outcome of the operation, and in those instances the completion signal can be issued when the outcome of the operation can be guaranteed to be observed by the required requester elements.

Since the combined write and cache maintenance operation request is actually specifying performance of two separate operations via a single request, then the recipient completer element can be arranged to issue separate write completion signals and cache maintenance operation completion signals in response to that single combined request. However, it should be noted that in some instances it may be possible to combine these two different completion signals provided that that combined completion signal can be specified in such a way that it will be understood by the given requester element as indicating both completion of the write and completion of the cache maintenance operation. This could for example be useful in situations where both the write completion and cache maintenance operation completion have occurred at essentially the same time, and hence a reduction in bandwidth can be achieved by combining the completion signals without imparting any appreciable delay in issuance of either completion signal to the requester element.

In one example implementation, the combined write and cache maintenance operation request will have an associated transaction identifier and that transaction identifier is used in responses returned to the given requester element to enable the requester element to match up the responses with the originating request. Hence, in such implementations, both the write completion signal and the separate cache maintenance operation completion signal can be arranged to use the same transaction identifier as specified in the combined write and cache maintenance operation request.

In one example implementation, the recipient completer element may be arranged to issue a plurality of signals during processing of the combined write and cache maintenance operation request. Whilst in some instances it may be that all of those signals are issued to the same upstream element, this may not always be the case, and it may in fact be necessary for certain signals to be issued to a different upstream element than other signals. In one example implementation the combined write and cache maintenance operation request may provide a target indication field that is used to determine a target element for each of the signals.

As an example, in one implementation the target indication field may indicate when a source element from which the recipient completer element is to obtain the item of data associated with the write operation is a different element to the given requester element that generated the combined write and cache maintenance operation request, and in that event the recipient completer element may be arranged to issue a data pull signal directly to the different element to trigger the different element to transmit the item of data to the recipient completer element.

By providing such a mechanism, this can provide support for direct write transfer within the apparatus when using combined write and cache maintenance operation requests. By way of specific example, the given requester element may be a node within the interconnect and the recipient completer element may be a slave node. However, it may be that the write data that is associated with the write operation still resides at an upstream master device, i.e. upstream of the node within the interconnect forming the given requester element. In such instances, the target indication field can be used to indicate to the slave device that it can obtain the write data directly from the master device, and in that instance the slave device may issue a data pull signal directly to the master device. This can lead to an improvement in performance by reducing the time taken to obtain the write data from the master device.

In one example implementation, the different element is an element that issued an initial combined write and cache maintenance operation request to the given requester element, and processing of that initial combined write and cache maintenance operation request by the given requester element resulted in the given requester element issuing the combined write and cache maintenance operation request to the recipient completer element.

However, it may not always be the case that the recipient completer element will be allowed to obtain the data directly from the different element that issued the initial combined write and cache maintenance operation request. For example, it may be the case that for at least one type of write operation, the apparatus is arranged to prohibit the obtaining of the item of data directly from the different element, and when the combined write and cache maintenance operation request relates to such a write operation, the target indication field is set to identify that the item of data is to be obtained from the given requester element. Hence, the target indication field can be used to directly control where the recipient completer element is to obtain the write data from.

However, the target indication field can also be used for other purposes. For example, the target indication field may indicate when a target element for a first signal issued by the recipient completer element during processing of the write operation differs from a target element for a second signal issued by the recipient completer element during processing of the cache maintenance operation. In particular, when processing a standard form of request that only specifies an associated single operation, it may be predetermined where the response signals need to be sent. However, the combined write and cache maintenance operation request specifies both a write operation and a separate cache maintenance operation, and it may be that the target for at least one of the response signals issued when performing the write operation is different to the target for at least one of the response signals issued when processing the cache maintenance operation. Through use of the target indication field, this enables such differences to be identified, thus enabling the recipient completer element to determine the appropriate target of the various signals that it generates during processing of the combined write and cache maintenance operation request.

As mentioned earlier, the determined visibility point may vary dependent on the memory region being accessed, and the requester elements that need to have visibility of the data. The cache maintenance operation can also be used to identify that the data should be pushed through to a point of persistence within the system, i.e. that the determined visibility point is a point of persistence. A point of persistence (PoP) is a point where data can be guaranteed to be retained even if power is removed from the system. In some instances, a point of persistence can be provided with a backup power source so that in the event of a loss of power to the system, the backup power source provides sufficient power for the data stored at the point of persistence to be migrated to non-volatile memory. This can in some instances allow a level of cache to form a point of persistence, or for a write buffer within a memory controller to form a point of persistence. Sometimes, the point of persistence can be specified as a deep point of persistence, a deep point of persistence being a point of persistence that will ensure retention of the data even if backup power fails. One example of a deep point of persistence would be the non-volatile memory itself.

When a cache maintenance operation is used to push data to a point of persistence, it may be the case that a persist signal needs to be issued to identify when the block of data associated with the specified memory address range has reached the point of persistence. This will typically occur sometime after the completion signal has been issued for the cache maintenance operation.

When seeking to implement such a cache maintenance operation that pushes data to a point of persistence, and hence where the determined visibility point is that point of persistence, certain signals issued when processing the write operation may need to be issued to a different element to certain signals issued when processing the cache maintenance operation. For example, the first signal may be a data pull signal issued by the recipient completer element to seek to obtain the item of data, and the second signal may be a persist signal issued to identify that the block of data associated with the specified memory address range has reached the point of persistence, and the target for those first and second signals may differ. As an example, when a request from a master device is received by a node within an interconnect, and then that node propagates on a request to a slave device, it may be that the element from which the write data is to be obtained is different to the element which should receive the persist signal. Purely by way of specific example, it may be that the write data needs to be obtained from the node within the interconnect, but the persist signal should be issued directly back to the original master device. The opposite situation could also apply.

In one example implementation, at least when processing one of the write operation and the cache maintenance operation, the recipient completer element is arranged to combine multiple signals into a single combined signal when the multiple signals are to be issued to the same target element. Hence, one or more of the signals produced when processing the write operation may be combined, and similarly one or more of the signals produced when performing a cache maintenance operation may be combined. As a further example, signals generated when processing the write operation may be combined with signals generated when processing the cache maintenance operation, hence resulting in combined write and CMO response signals. By combining signals where possible, this can lead to a reduction in bandwidth usage in the signal paths within the apparatus, which in turn can increase overall throughput.

There are various different scenarios that may occur that cause the given requester device to determine that it is appropriate to issue a combined write and cache maintenance operation request instead of a separate write request and subsequent cache maintenance operation request. As one example, the cache maintenance operation request may identify a cache maintenance operation that is also performed by the given requester element in respect of a given level of cache associated with the requester element, and the given requester element may be arranged to detect the need to issue a write request prior to the cache maintenance operation request when performance of the cache maintenance operation in respect of the given level of cache requires the item of data to be evicted from that given level of cache. Hence, the local performance of the cache maintenance operation may itself give rise to a situation where write data needs to be evicted, and hence there is a need for a write request. However, in such instances, the latency impact can be significantly reduced by issuing a combined write and cache maintenance operation request, thereby avoiding the need to serialise the cache maintenance operation request behind the write request, and in particular avoiding the need for the given requester element to delay issuance of the cache maintenance operation request until a completion signal is received in respect of the write request.

As another example, the given requester element may incorporate a buffer to hold pending write requests prior to issuance of those pending write requests from the given requester element, and the given requester element may be arranged to detect the need to issue a write request prior to the cache maintenance operation request when a pending write request in the buffer is directed to an address within the specified memory address range for the cache maintenance operation request. Prior to use of the techniques described herein, it would typically have then been necessary for the pending write request to first be issued and the given requester element to then await receipt of a completion signal for the write operation, before the given requester element could then issue the cache maintenance operation request. However, when using the techniques described herein that delay is avoided, since a combined write and cache maintenance operation request can be issued, allowing the recipient completer device to begin processing of the cache maintenance operation without waiting for the write operation to complete.

As a still further example, when the given requester element detects a need to write the item of data to a point of persistence, the given requester element may be arranged to issue the combined write and cache maintenance operation request, so that performance of the cache maintenance operation will cause the item of data to be pushed to the point of persistence. In particular, when it is determined necessary to write an item of data to a point of persistence, it is not typically possible for the write request itself to specify that the data needs to be written to the point of persistence, and instead a separate cache maintenance operation needs to be performed to achieve that effect. However, when using the techniques described herein, there is no need to defer issuance of the cache maintenance operation request until a completion signal has been received for the write, and instead a combined write and cache maintenance operation request can be issued directly from the given requester element.

As discussed earlier, the requester elements and completer elements can take a variety of forms. In one example implementation, the given requester element is a master device used to generate transactions processed by interconnect circuitry incorporating the recipient completer element that receives the combined write and cache maintenance operation request issued by the master device.

In another example implementation, the given requester element is an intermediate element within interconnect circuitry that both acts a completer element to perform the cache maintenance operation in response to a request from an upstream element and acts as the given requester element to issue the combined write and cache maintenance operation request to a downstream completer element.

In such an implementation, the request from the upstream element can take a variety of forms. For example, that request may merely specify performance of a cache maintenance operation. However, alternatively the request from the upstream element may also take the form of a combined write and cache maintenance operation request.

In one example implementation, when processing the combined write and cache maintenance operation request, the recipient completer element is responsive to determining that the item of data needs to be propagated on to a downstream element, to determine whether the cache maintenance operation also needs to be performed by the downstream element. In particular, whilst the write data may need to be propagated on to a downstream element, it may be that there is no need for a cache maintenance operation to be performed beyond the current recipient completer element. For example, the current recipient completer element may be associated with the final level of cache in the cache hierarchy, and by performing the cache maintenance operation in respect of that final cache level, it may be determined that there is no need to propagate on the cache maintenance operation to a downstream element. However, when the cache maintenance operation specifies a point of persistence that lies beyond the final level of the cache hierarchy, it may still be necessary to issue the cache maintenance operation to the downstream element.

As another example, even if the cache maintenance operation is not seeking to push the data to a point of persistence it can in certain situations be the case that one of the requester elements that needs to have visibility of the data is a requester element that does not make use of the cache hierarchy, and hence for example may have a path directly into a memory controller beyond the cache hierarchy. In such situations, it may again be necessary for the cache maintenance operation to be pushed beyond the final level of the cache hierarchy in order to ensure that the data reaches the required visibility point, in this case the memory controller.

In one example implementation, on determining that the cache maintenance operation also needs to be performed by the downstream element, the recipient completer element is arranged to issue either a further combined write and cache maintenance operation request to the downstream element, or a write request to the downstream element followed by a subsequent cache maintenance operation request to the downstream element. Hence, it is possible for an element in the system that receives a combined write and cache maintenance operation request, and determines the need to propagate both the write and cache maintenance operation to a downstream element, to either maintain a combined write and cache maintenance operation request for that onward request to the downstream element, or to split the requests so that separate write requests and cache maintenance operation requests are issued to the downstream element.

Particular examples will now be described with reference to the Figures.

FIG. 1 is a block diagram of an apparatus in accordance with one example implementation. The apparatus includes a plurality of master devices 10, 20, 30 that are coupled via an interconnect 40 to a slave device 55. The slave device in this example is coupled to main memory 60. The slave device may take a variety of forms, but for example may be a memory controller. It will be appreciated that a typical system may include more master devices, and indeed may include multiple slave devices. One or more levels of cache may be provided within certain of the master devices, and indeed one or more levels of cache may be provided within the interconnect. Further, in some implementations it may be possible for a level of cache to exist beyond the interconnect, for example in association with the slave device.

In the example shown it is assumed that the master devices 10, 20 are fully coherent master devices whose caches 15, 25 are kept coherent with caches in a lower level of the cache hierarchy, such as a system cache 50 provided within the interconnect 40. To maintain this coherency, cache coherency circuitry 45 is provided which can employ a cache coherency protocol in order to seek to ensure that each of the fully coherent master devices 10, 20 has a coherent view of the data cached within the cache hierarchy. It will be understood that a variety of different cache coherency protocols can be used, and the cache coherency circuitry can employ various mechanisms in order to seek to maintain coherency. For example, the cache coherency circuitry 45 may employ a snoop-based cache coherency mechanism, whereby in response to a request from one of the coherent master devices 10, 20, it can issue snoop requests to one or more other fully coherent master devices 10, 20 in order to determine whether those other coherent master devices have cached copies of the data that the requesting coherent master device is seeking to access. Whilst the fully coherent master devices may themselves have more than one level of cache, for simplicity a single level of cache is shown in FIG. 1, and accordingly the fully coherent master device 10 has an associated local cache 15 and the fully coherent master device 20 has a local cache 25. At a lower level in the cache hierarchy, a system cache 50 is provided within the interconnect 40, and the cache coherency circuitry 45 ensures coherency between the contents of the various caches 15, 25, 50 so that each fully coherent master device has a coherent view of the data.

It should be noted that not all of the master devices needs to be fully coherent master devices, and by way of example an input/output (I/O) coherent master device 30 is shown. Such an I/O coherent master device may or may not have a load cache, such as cache 35 illustrated in FIG. 1, but if it does have a cache the contents of that cache 35 are not kept coherent by the cache coherency circuitry 45 in the interconnect, and hence for example the cache 35 would not be the subject of any snoop requests from the cache coherency circuitry 45. If the data generated by the I/O coherent master device 30 is to be made visible to other devices within the system, then software executing on the I/O coherent master device 30 will need to write that data out from the coherent master device 30, which may for example result in the data being written to main memory 60.

The I/O coherent master device can be used to couple the apparatus shown in FIG. 1 to an upstream network or an upstream component 70. Purely by way of specific example, the I/O coherent master device 30 may be a PCIe interface for connecting the apparatus shown in FIG. 1 to a PCIe network forming the upstream network 70.

As shown in FIG. 1, when considering a pair of components within the apparatus, the component nearer memory may be referred to as the downstream component and the component more remote from memory may be referred to as the upstream component. Accordingly, the cache coherency circuitry 45 will be a downstream component when compared to the master devices 10, 20, 30, but will be an upstream component when considered relative to the slave device 55.

During operation, there can be a need for certain items of data generated by components within the apparatus to be made visible to other components that could request access to that data. To facilitate this, it may be necessary to push that data through the cache hierarchy to a determined visibility point within the apparatus. The determined visibility point may vary dependent on the memory region associated with the data in question, and/or the elements that need to have visibility of that data. For example, the visibility point could be a point of coherence or a point of serialisation within the system, which may for example be at the cache coherency circuitry 45 and associated system cache 50. Whilst the system cache level 50 may provide a suitable downstream visibility point if all of the requester devices that need to have visibility of that data have access to the system cache, if any master device that needs to have visibility of the data does not use the system cache, it may be necessary for the visibility point to be at a more downstream location within the apparatus, for example at the slave device level 55. This might for example be the case if the I/O coherent master device 30 needs to have visibility of the data in question, but does not access the system cache 50, and instead bypasses the system cache and accesses main memory 60 directly via the slave device 55. It may be that the slave device includes some local buffering in which write data can be stored prior to being written out to main memory, and in that instance those write buffers within the slave device 55 may be viewed as a visibility point to which the write data needs to be pushed.

It is also the case in some instances that write data needs to be written to a point of persistence within the apparatus, so that it can be guaranteed that the data will not be lost if power is removed from the system. Whilst non-volatile memory would be an example of a point of persistence, it is sometimes possible to arrange for more upstream components to provide a point of persistence. For example, write buffers within the slave device 55 may be provided with backup power sufficient to ensure that, in the event of loss of main power from the system, the backup power will allow any data in the write buffers to be written out to main memory 60. Similarly, in some instances the system cache 50 might be provided with such backup power, sufficient to ensure that any contents in the system cache can be written out to main memory in the event of a power failure. In some instances, a distinction is made between a point of persistence and a deep point of persistence, a deep point of persistence being a point of persistence that can ensure the data is retained even if backup power fails. An example of a deep point of persistence would be the non-volatile memory itself.

A point of persistence can hence be viewed as a specific example of a desired visibility point, and there will be a variety of situations where it is necessary for write data to be pushed to a desired visibility point. Typically it is not possible using the write operation itself to ensure that data is written to a particular visibility point within the system. For example, data issued by a master device may be cached within a cache level that is at a higher level in the cache hierarchy than a level associated with the required visibility point. Accordingly, it is known to use cache maintenance operations as a mechanism for pushing data to a desired downstream visibility point. A cache maintenance operation may be performed in respect of a particular cache level, and then, if that cache level is upstream of the desired visibility point, a request to perform the cache maintenance operation can be propagated on through the cache hierarchy until performance of the cache maintenance operation has caused the data to reach the desired visibility point. In situations where the desired visibility point is a specific level within the cache hierarchy, then there is no need for the cache maintenance operation to be performed beyond that level in the cache hierarchy. However, as mentioned earlier, in some instances one or more of the master devices that needs to have visibility of the data may not access the cache hierarchy, and if that is the case the cache maintenance operation may need to be propagated on beyond the lowest level of the cache hierarchy, in order to ensure that the data in question is pushed to the required visibility point. This may also for example be the case if the cache maintenance operation is being used to push data to a point of persistence, where the point of persistence is beyond the lowest level in the cache hierarchy.

If when performing such a cache maintenance operation (CMO), a write in progress in encountered, or the performance of the cache maintenance operation in a particular cache results in the need to evict data from that cache, and hence the need to issue a write request from that cache, it has typically been necessary for the onward propagation of the cache maintenance operation to stall at that point until the preceding write request has been handled. In particular, it has typically been necessary to await receipt of a completion response in respect of that earlier write request before propagating on a cache maintenance operation request to a downstream component. However, this gives rise to significant latency issues in the processing of the cache maintenance operation. In accordance with the techniques described herein, this latency issue is alleviated by allowing a requester element within the system to detect situations where there is a need to issue a write request prior to the cache maintenance operation request, and in that instance to generate a combined write and cache maintenance operation request that can be issued to a recipient completer element within the system for handling. The recipient completer element is then able to initiate processing of the cache maintenance operation without waiting for the write operation to complete. This can significantly reduce latency when compared with the previous technique which required the write operation to complete before the cache maintenance operation request was even issued. Further, such an approach can reduce bandwidth usage within the system, by enabling a single request signal to be issued instead to two separate request signals.

Figure 2:
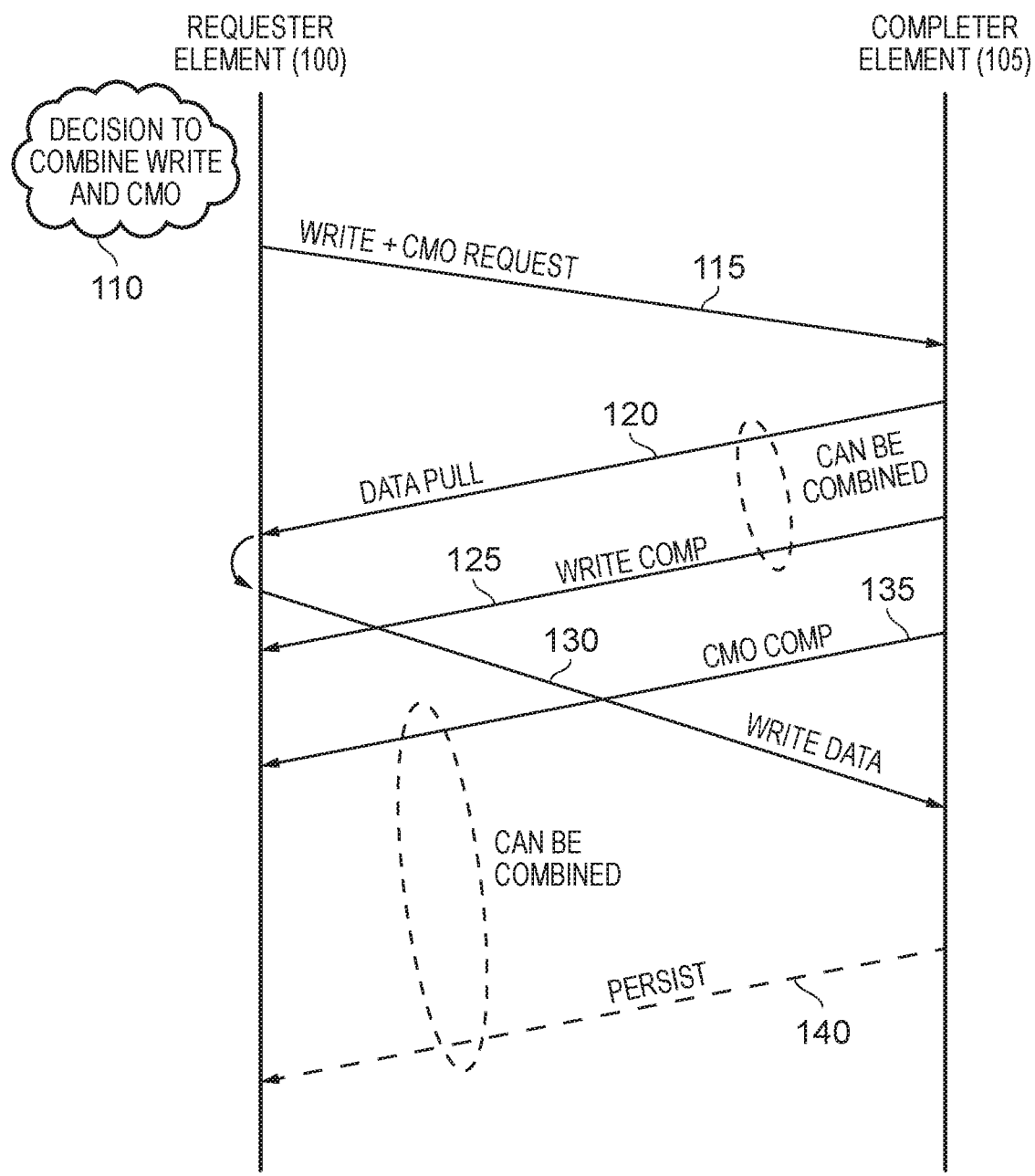
FIG. 2 is a timing diagram illustrating various signals passed between a requester element and a completer element during the processing of a combined write and cache maintenance operation request in accordance with one example implementation.

FIG. 2 is a timing diagram illustrating the handling of a combined write and CMO request in accordance with one example implementation. As shown, a requester element 100 may wish to communicate with a completer element 105. The requester element can take a variety of forms, and hence for example could be a master device 10, 20, 30, or some intermediate node between the master device and a slave device, for example a node incorporating the cache coherency circuitry 45. Similarly, the completer element can take a variety of forms, and hence for example could be the slave device 55, or could be an intermediate node such as the cache coherency circuitry 45.

As shown in FIG. 2 by the bubble 110, at a certain point in time the requester element makes a decision to combine a write request and a CMO request into a single write and CMO request which is propagated to the completer element 105, as shown by the line 115. The completer element 105 then detects the need to perform a write operation and also to perform a CMO operation, and can initiate processing of both operations. Whilst processing the write operation, once the completer element 105 determines that it has sufficient buffer space to receive the write data, it can issue a data pull request 120 to the requester element 100, which then results in the write data being issued from the requester element to the completer element, as shown by the line 130. Further, once the completer element has set up any required hazarding checks that will ensure that a subsequent request issued by a requester element for access to the same memory address as associated with the write operation will be processed by the completer element so that the requester element accesses the write data (i.e. the write data that will be provided over path 130), then the completer element can issue a write completion signal as indicated by the line 125 to identify to the requester element that the write operation is considered completed. The requester element 100 needs to await receipt of the write completion signal before it is in a position to issue a subsequent request to the same address.

As indicated in FIG. 2, if desired, the data pull and the write completion signal can be combined into a single response signal issued from the completer element 105 to the requester element 105, thus reducing bandwidth usage by avoiding the need to send two separate signals. This may for example be appropriate if by the time the completer element has buffer space available to receive the write data, it has also taken the steps necessary to make sure that the write data will be made observable to subsequent requests issued to that completer element specifying the same address.

Whilst processing the write operation, the completer element 105 can also begin processing the CMO. Performance of the CMO may involve performing a lookup in any local cache of the completer element to determine whether the data associated with the CMO request has been cached in the local cache and then taking any necessary action in respect of the cache line containing that data in order to implement the cache maintenance operation. In much the same way as performance of the write operation, it may also involve setting up address hazard checks so as to ensure that the data in question will be observable for any subsequent request issued to the completer element by a requester element that is to have visibility of that data. Typically, the CMO request may identify a memory address range for a block of data that can be stored within a single cache line, and accordingly a lookup based on that memory address range information can be used to identify whether there is a cache line within the cache storing the data in question. The associated write operation may relate to a particular portion of the data in that cache line, or may itself also relate to the entire cache line. Hence, it will be seen that the address hazard checking that needs to be set up in order to issue a write completion signal may be essentially the same as the address hazard checking that needs to be set up in order to issue a completion signal for the CMO, and hence in some instances a completion signal for the CMO may be able to be issued in close proximity to the completion signal for the write, such as the CMO completion signal indicated by line 135 in FIG. 2. Indeed, in some instances it may be possible for the CMO completion signal to be issued before the write completion signal, for example because the write completion signal might be late in being formatted and sent.

However, it is necessary to issue indications for both completion of the CMO and completion of the write operation, since they were essentially two separate operations identified by the single write and CMO request.

The write and CMO request passed over path 115 will typically specify a transaction ID, and that transaction ID will be included in both the write completion signal on path 125 and the CMO completion signal on path 135, to enable the requester element to match the completion signals with the original request.

As will be noted from FIG. 2, the CMO completion signal can be issued before the write data has even been received by the completer element, and processing of the CMO can begin before completion of the write operation. This gives rise to a significant latency reduction in the processing of the CMO, when compared with the previous approach where it would have been necessary to await receipt of the write completion signal before even issuing the CMO request from the requester element.

As mentioned earlier, the requester element 100 will need to await receipt of the write completion signal 125 before issuing any subsequent request to the same address. However, the requester element may or may not need to also wait for the CMO completion request before issuing such a subsequent request to the same address. In some situations this may not be necessary, and the requester element may be able to issue a subsequent request to the same address as soon as the write completion signal 125 is received without awaiting receipt of the CMO completion signal 135. However, if the CMO is being performed as a mechanism for passing a barrier, the system may be arranged so that any later request will not be issued until the CMO completion signal is received. Hence, in a general sense, the sending of subsequent requests without waiting for the CMO completion signal depends on the memory attributes of the targeted memory, the architectural implementation, and/or whether there is a barrier after the CMO, or the CMO is being used as part of the process of completing a barrier sequence at the master.

As discussed earlier, in some instances the CMO may be being used to push data to a point of persistence. In such instances, the CMO request may take the form of a persistent CMO request, and the combined write and CMO request 115 will identify whether the CMO is a persistent CMO or a normal CMO. In the event that the CMO is implementing a persistent CMO, then as indicated by the dotted line 140, the completer element 105 may be arranged to issue a persist signal back to the requester element once it has been confirmed that the data that is the subject of the CMO has been pushed to the point of persistence. The persist signal can be combined with the CMO completion signal if desired. It will be appreciated that the persist signal will need to be issued at some point after the write data has been received, since that write data will need to be written at the point of persistence. The point of persistence may be at the completer element 105, or may in some instances be at a component downstream of the completer element 105, in which case there may be a longer delay between receipt of the write data by the completer element and the completer element being in a position to issue the persist signal on path 140. However, in some implementations only a single persist signal will be issued, and it will be issued from the completer element associated with the point of persistence rather than being routed back through any intervening elements.

Whilst FIG. 2 illustrates the possibility of combining certain write response signals, and/or combining certain CMO response signals, it should also be noted that through use of the combined write and CMO request signal, enabling the completer element to essentially process both the write operation and the CMO in parallel, situations can arise where certain write responses can be combined with certain CMO responses, hence producing combined write and CMO response signals that can further reduce bandwidth utilisation. Hence, purely by way of example, a single combined signal could be generated to indicate both write completion and CMO completion (a combined write comp and CMO comp signal), the write completion, data pull and CMO completion could be combined into a single signal (a combined write comp, data pull and CMO comp signal), the data pull and CMO completion could be combined into a single signal (a combined data pull and CMO comp signal), or the persist signal could be combined with any combination of the above.

Figure 3:
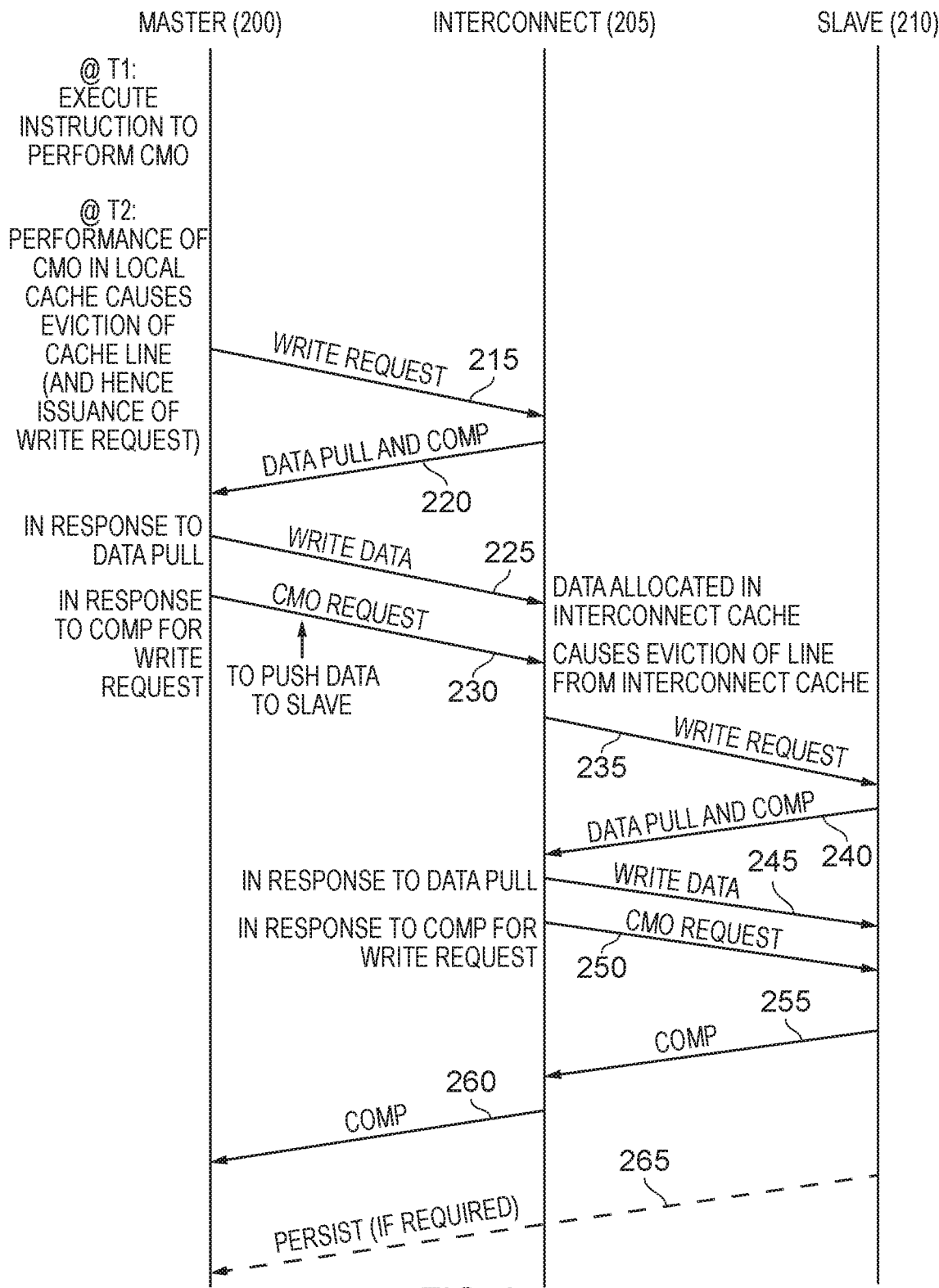
FIG. 3 is a timing diagram illustrating a sequence of signals that may pass between a master device, an interconnect and a slave device in accordance with a first example scenario, but where the combined write and cache maintenance operation request of the techniques described herein is not used, whilst

As discussed earlier with reference to FIG. 1, there may not merely be a single requester element and a single completer element, since a request may need to be propagated through multiple elements within the system. FIG. 3 illustrates a first example situation where a request needs to be passed from the master 200 to an interconnect 205, and then onwards to a slave 210. In the example shown in FIG. 3, it is assumed that the technique described herein is not used, and accordingly there is no ability to send a combined write and CMO request.

In this first example, it is assumed that the master device is executing software, and at some point executes an instruction to perform a CMO within its local cache. During the performance of the CMO in the local cache, this causes an eviction of a cache line from the cache, and hence the need to issue a write request. A write request is then issued as indicated by the line 215. The issuance of this write request causes a delay in issuing a CMO request downstream to the interconnect, since the master device needs to await completion of the write operation before it is in a position to issue the CMO request.

In this example, it is assumed that a combined data pull and completion signal is issued by the interconnect 205, as indicated by the line 220. In response to the data pull, the write data can then be issued to the interconnect, as indicated by line 225, and in response to the completion signal the master can now issue the CMO request in order to push the data to the slave device. It should be noted as discussed earlier that the CMO request itself may not specify where the data needs to be pushed to, and instead system information may be used to determine the type of memory region associated with the data, and the requester elements that need to have visibility of that data, and this will determine the visibility point to which the data needs to be pushed. However, in this instance it is assumed that that visibility point is the slave device 210.

In the example illustrated in FIG. 3, it is assumed that the data is allocated in a cache provided by the interconnect, for example the system cache 50 shown in FIG. 1, and hence the interconnect does not issue a write request, or the write data, to the slave 210 at this point in time.

However, on receipt of the CMO request, the interconnect performs the cache maintenance operation in its associated cache, and it assumed that performance of this cache maintenance operation causes eviction of the relevant cache line from the interconnect cache, i.e. the cache line comprising the data that has just been written into the cache. As a result, a write request is issued to the slave, as indicated by the line 235. The issuance of this write request effectively blocks the ability to issue the CMO request downstream to the slave, since the interconnect needs to await completion of the write operation before issuing the CMO request.

Again it is assumed that a combined data pull and completion signal is sent from the slave to the interconnect, as indicated by the line 240, this enabling the write data to be issued to the slave device as indicated by the line 245, and the CMO request to then be issued to the slave as indicated by the line 250.

The CMO operation will then be processed by the slave device, and when the necessary steps have been taken by the slave device a completion signal can be issued as indicated by line 255 to indicate that the CMO operation has been completed. Once the completion signal has been received by the interconnect, then a completion signal can also be sent from the interconnect 205 to the master 200 to indicate completion of the CMO request that was issued over line 230 from the master to the interconnect.

In the event that the CMO is a persistent CMO, the slave device may be arranged to issue a persist signal when the data has been written to the point of persistence, and in one example implementation may issue that persist signal directly back to the master 200, as indicated by the line 265.

If the slave device determines that the particular region of memory targeted by the CMO request is not part of a persistent memory device, the slave device could be arranged to send the persist response without waiting for the data. This is because the persist response has no functional meaning, but might be required to complete the CMO protocol flow. In such cases the slave device might include in the persist response an indication of non-existent persistent memory.

It will be appreciated from FIG. 3 that in both the communication from the master to the interconnect and the communication from the interconnect to the slave, there is a delay in issuing the CMO request whilst awaiting a completion for the preceding write operation.

Figure 4:
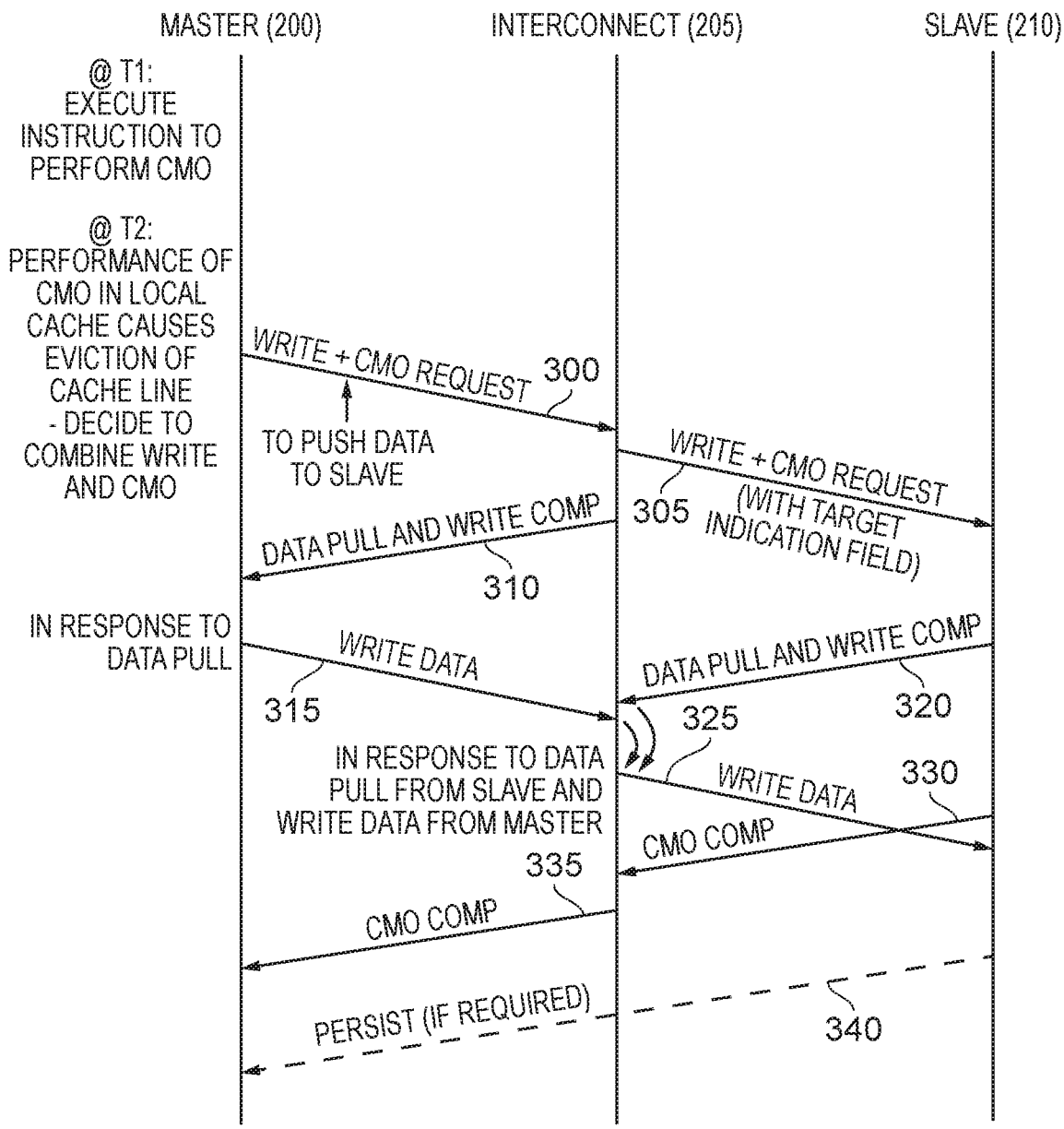
FIG. 4 is the equivalent timing diagram for the same example scenario, but where the combined write and cache maintenance operation request of the techniques described herein is used.

FIG. 4 illustrates the same example, but in a situation where both the master device and the interconnect device can issue combined write and CMO requests. Hence, it is again assumed that the master is executing an instruction that causes a CMO to be performed in its local cache, and this again causes data to be evicted from the cache, hence necessitating the issuing of a write request. However, rather than issuing the write request before issuing the CMO request, the master device 200 decides to issue a combined write and CMO request as indicated by the line 300. The CMO request serves to cause the data to be pushed to a desired visibility point, and again it is assumed that that desired visibility point is the slave 210. When the interconnect 205 receives the combined write and CMO request, it can determine that the data in question needs to be pushed through to the slave device, by reference to the earlier-mentioned system information, and hence knows at that point that the data will need to be written out to the slave. Accordingly, it can directly issue a combined write and CMO request to the slave device 210, as indicated by the line 305. This second write and CMO request can include a target indication field that can be used to identify where the various responses that the slave will issue when processing both the write operation and the CMO should be sent. In particular, it may be the case that not all of the response signals need to be sent to the same element. As a specific example that is relevant to FIG. 4, if the CMO is a persistent CMO, it may be the case that the persist signal can be issued directly back to the master 200, but in this instance it is assumed that the data pull request needs to be sent back to the interconnect, and cannot be sent directly back to the master device.

Since the interconnect 205 has set the target indication field in this way, it knows that it needs to obtain the write data itself, and hence can issue a data pull request back to the master device. In the example shown, the data pull request is again combined with the completion signal as indicated by line 310, but in this instance the completion signal needs to specify that it is a write completion signal so that the master can distinguish between the completion of the write and the completion of the CMO.

In response to the data pull request over line 310, the master 200 can then issue the write data, as indicated by line 315.

Similarly, at the slave device, the slave device can perform the necessary steps to complete the write operation, and once buffer space is available can issue a data pull request and a write completion signal back to the interconnect. Again, in this example it is assumed that both signals are combined into a single data pull and write completion response, as indicated by the line 320. Once the data pull request has been received from the slave device 210, and the write data has been received from the master 200, the interconnect 205 can issue the write data to the slave device, as indicated by the line 325.

Further, as discussed earlier with reference to FIG. 2, the slave device 210 can begin processing the CMO upon receipt of the combined write and CMO request, and does not need to await for the write to complete. Thus, the CMO completion signal can be issued much earlier than in the earlier discussed example of FIG. 3, as indicated by the line 330 in FIG. 4. On receipt of the CMO completion signal from the slave, the interconnect 205 can also then propagate on the CMO completion signal back to the master, as indicated by the line 335. As also discussed earlier with reference to FIG. 2, if the CMO is a persistent CMO, then once the slave device determines that the data has been written to the point of persistence, a persist response can be issued back to the master device, as indicated by the line 340. However, if the CMO specified by the combined write and CMO request is not a persistent CMO, then there will be no need for the persist signal to be issued.

From a comparison of FIGS. 3 and 4, it will be appreciated that the use of the combined write and CMO request can significantly reduce the latency in handling the CMO operation within such a system. Further, the use of the combined write and CMO request can significantly reduce the bandwidth usage in the signal paths between the master and the interconnect and the interconnect and the slave, hence improving throughput within the system.

Figure 5:
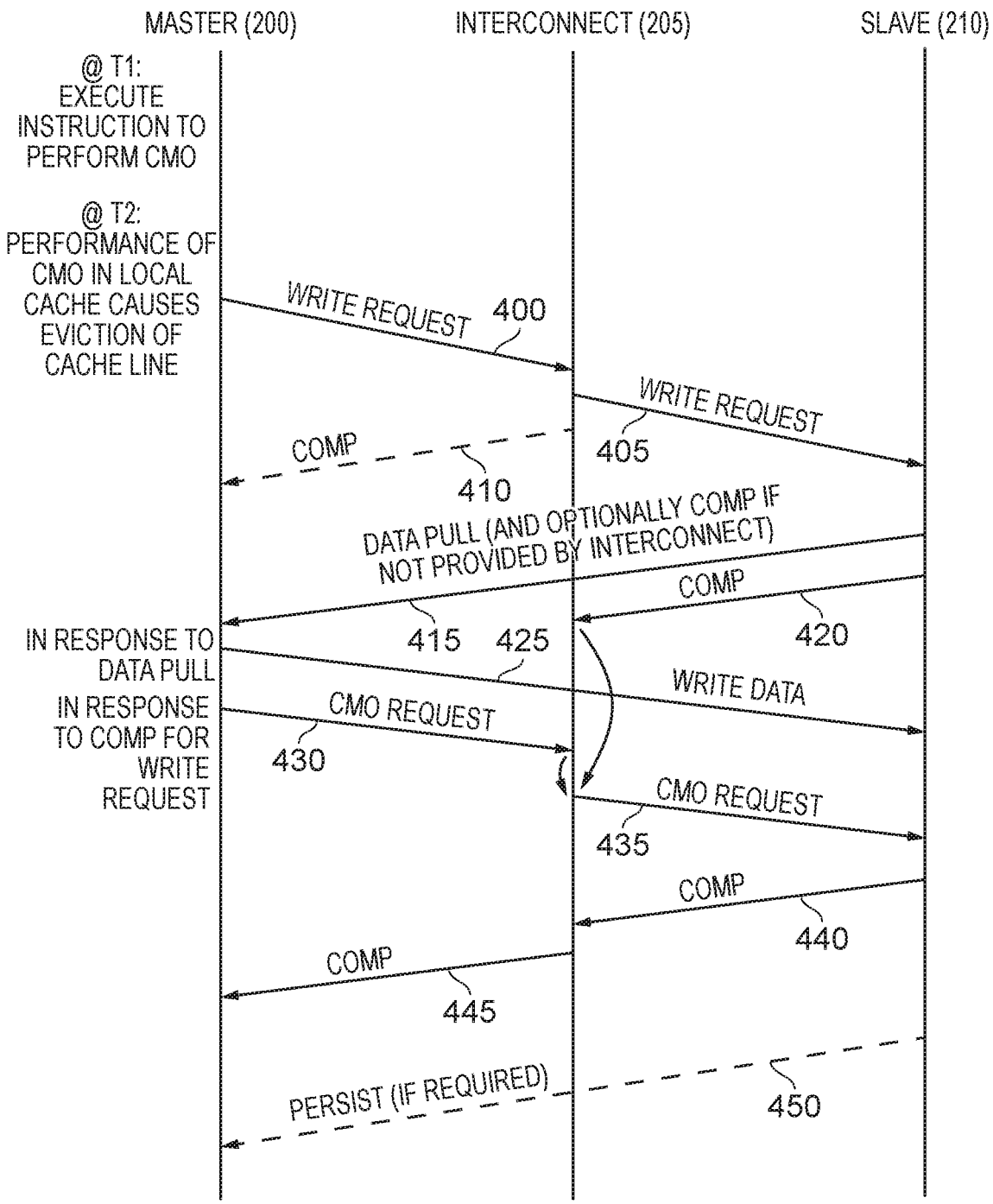
FIG. 5 is a timing diagram illustrating a sequence of signals that may pass between a master device, an interconnect and a slave device in accordance with a second example scenario, but where the combined write and cache maintenance operation request of the techniques described herein is not used, whilst
Figure 6:
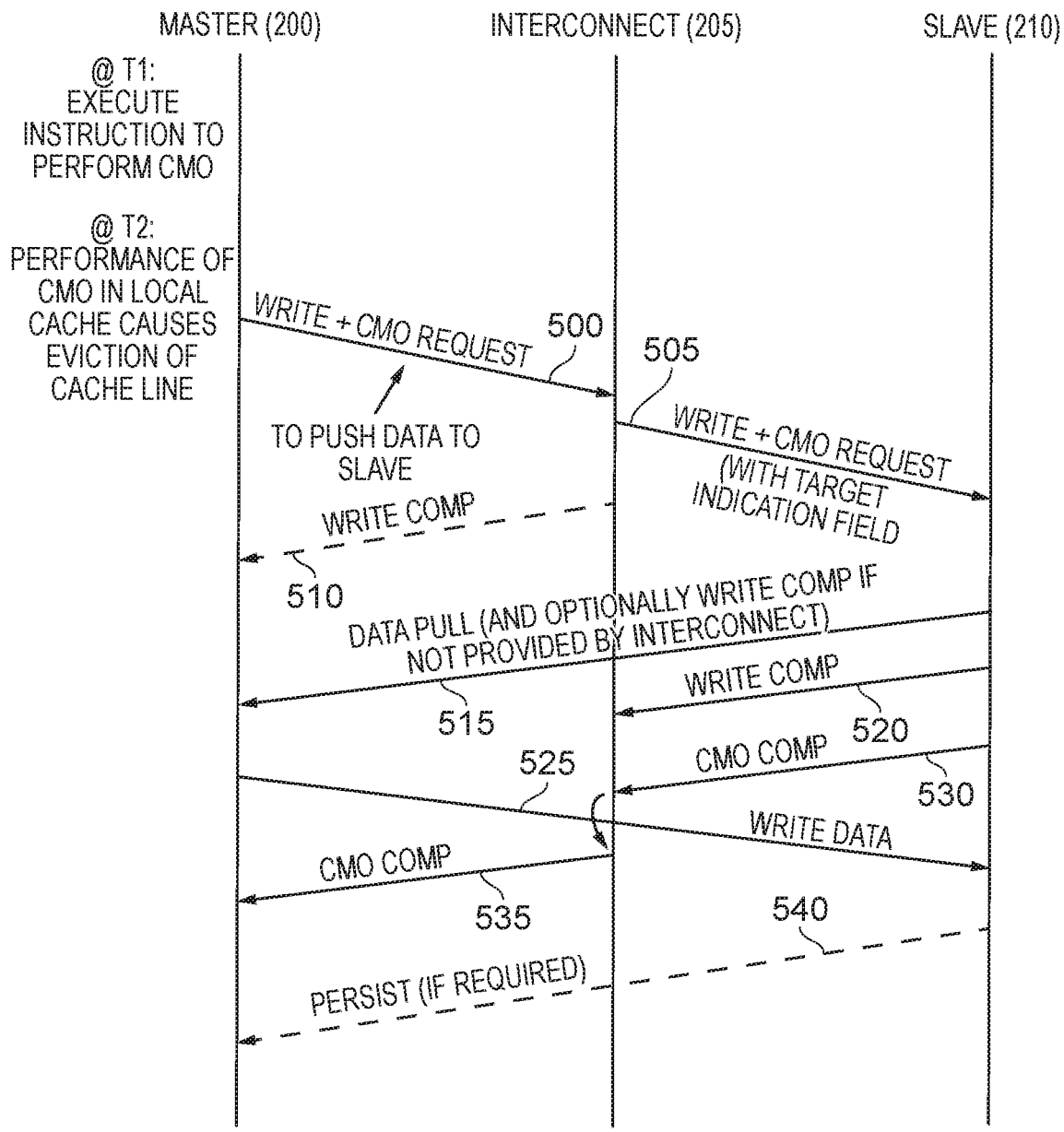
FIG. 6 is the equivalent timing diagram for the same example scenario, but where the combined write and cache maintenance operation request of the techniques described herein is used.

FIGS. 5 and 6 illustrate another example scenario, again firstly without using the combined write and CMO request, and then using the combined write and CMO request. However, in this instance a scenario is considered where direct write transfer is allowed from the master to the slave. As with the earlier examples, it is assumed that the master executes an instruction to perform a CMO in its local cache, and this causes a cache line to be evicted from that local cache. This causes a write request to be issued, as shown by the line 400 in FIG. 5. In this instance, as direct transfer from the master to the slave is allowed, the write request is propagated on directly from the interconnect 205 to the slave, as shown by the line 405. In one example implementation, a completion for the write can be issued from the interconnect once it has set up the necessary hazard checks as discussed earlier, as indicated by the dotted line 410. However, in an alternative implementation a completion signal can instead be issued directly from the slave device back to the master device as indicated by the line 415.

In this implementation, since the write data can be obtained by the slave directly from the master, a direct data pull request to the master is issued from the slave, as indicated by line 415. This may optionally be combined with the completion signal if the slave device is providing the completion signal to the master rather than the interconnect 205 providing the completion signal to the master.

However, in addition a completion signal also needs to be issued to the interconnect so that the interconnect knows that the slave device has completed the write operation, as shown by the line 420.

In response to receipt of the data pull request, the master 200 issues the write data directly to the slave device, as indicated by line 425. Further, on receipt of the completion signal for the write, the master device can then issue the CMO request to the interconnect, as indicated by the line 430.

On receipt of the CMO request, and once the completion signal has been received from the slave device indicating that the slave device has completed the write operation, then the interconnect 205 can propagate on the CMO request to the slave as indicated by the line 435.

Once the CMO has been performed by the slave, then a completion signal can be issued back to the interconnect as indicated by the line 440. Thereafter, the interconnect can issue a completion signal back to the master device 200 as indicated by the line 445, to indicate that the CMO request issued by the master has now been completed. As before, if the CMO specifies a persistent CMO, then a persist response can be issued from the slave back to the master to identify that the data in the identified cache line has been written to the point of persistence.

FIG. 6 is an equivalent timing diagram, but illustrating an example where the combined write and CMO request is used. Accordingly, when the performance of the CMO in the local cache causes an eviction of a cache line, the master 200 decides to send a combined write and CMO request, as indicated by the line 500. As with the earlier example discussed with reference to FIG. 4, the interconnect can then propagate on a combined write and CMO request to the slave 210 as indicated by the line 505, and may also optionally issue a write completion response to the master 200 as indicated by the line 510. As also discussed with reference to FIG. 4, the combined write and CMO request issued by the interconnect can include a target indication field to provide some information usable by the slave to determine where certain responses generated by the slave should be sent. In this instance, the target indication field can be used to identify that direct write transfer is supported, and that hence a direct data pull request can be issued to the master 200. The target indication field can also be used to distinguish between the targets for signals that may be issued when processing the write operation and signals that may be issued when processing the CMO, since it may be that the targets for those signals differ dependent on whether the write operation is being performed or the CMO is being performed.

As shown in FIG. 6, once the slave has determined it has buffer space to receive the write data, it sends a data pull request directly back to the master, as indicated by the line 515. If the slave is also issuing the write completion signal rather than the interconnect, the slave can issue that write completion signal directly back to the master, and this write completion signal can be combined with the data pull signal if desired (as per the example shown in FIG. 6). A write completion signal is also issued back to the interconnect to inform the interconnect that the write operation has been completed by the slave device, as indicated by line 520.

The slave device can perform the cache maintenance operation without waiting for the write operation to complete, and can issue a CMO completion signal back to the interconnect as soon as the necessary steps have been taken by the slave device in respect of the cache maintenance operation, as indicated by the line 530.

The master device is arranged to be responsive to the data pull signal to then issue the write data directly to the slave device, as indicated by the line 525.

Once the interconnect signal receives the CMO completion signal from the slave, it can then issue a CMO completion signal back to the master device, as indicated by the line 535.

As with the other examples, a persist signal can be issued from the slave directly back to the master in situations where the CMO is a persistent CMO, with the persist signal being issued once the slave device has determined that the write data has been written to the desired point of persistence. In the example illustrated in FIG. 6, it is assumed that the slave device is the point of persistence, and hence there is a relatively short delay between the receipt of the write data and the ability to issue the persist signal. However, if the point of persistence was beyond the slave device, and hence the write data needs to be propagated on by the slave device to a downstream element, the slave device would not be able to issue the persist signal until it had received confirmation from the downstream element that the data had been written to the point of persistence, and accordingly in that case there would be more of a delay between receipt of the write data by the slave device and the slave device being in a position to issue the persist signal.

From a comparison of FIGS. 5 and 6, it will be seen by using the combined write and CMO request a significant reduction in latency can be achieved. Further, by supporting direct write transfer for the write operation, further performance benefits can be realised by avoiding the need to route certain signals via intermediate nodes, and instead allowing a single hop data transfer from the master to the slave.

FIG. 7 is a table illustrating various ways in which the combined write and CMO request may be used when considering communications from a master to an interconnect and subsequent communications from an interconnect to a slave. Case 1 shown is that used when discussing FIGS. 4 and 6 earlier, where both the master sends a combined write and CMO request to the interconnect and the interconnect sends a combined write and CMO request to the slave. Cases 2 and 3 illustrate scenarios where the master issues a combined write and CMO request to the interconnect, but the interconnect does not issue a combined write and CMO request to the slave. In particular, in accordance with case 2, the interconnect may separate the write request and the CMO request and hence not issue a combined write and CMO request. In case 3, the interconnect may decide that there is no need for the CMO to be propagated beyond the interconnect, because it is determined that the data can be guaranteed to reach the desired visibility point without any need to perform a downstream cache maintenance operation. In that instance it may only issue the write request downstream to the slave.

Case 4 illustrates another example where a standard CMO request is issued from the master to the interconnect, i.e. where there is no write request needed to be sent from the master to the interconnect. However, in processing the CMO at the interconnect, the interconnect may determine that there is a need to issue a write request prior to the CMO request, for example because performance of the CMO at the interconnect causes a cache line to be evicted from the interconnect's cache. In this instance, it has the option to issue a combined write and CMO request from the interconnect to the slave in order to reduce the latency in handling the downstream CMO request.

As another example not shown in FIG. 7, it is possible that a combined write and CMO request is issued from the master to the interconnect, but the interconnect determines that there is no need to send any further requests downstream. For example, the interconnect may be able to cache the data in its local cache, and that local cache may represent the desired visibility point. Accordingly, there is no need to propagate downstream either the write operation or the CMO.

Figure 8:
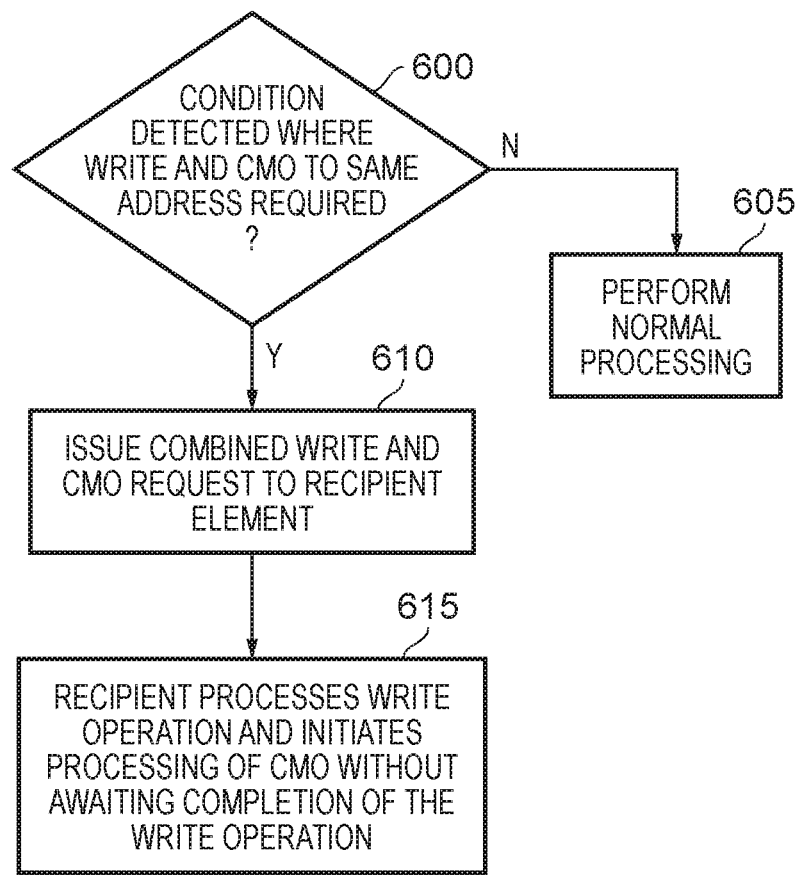
FIG. 8 is a flow diagram illustrating a process performed in one example implementation.

FIG. 8 is a flow diagram illustrating a sequence of steps performed by the apparatus described herein, in accordance with one example implementation. At step 600, a requester element determines whether a condition has been detected indicating that a write operation and a CMO to the same address are required. If not, then normal processing is performed at step 605. However, if the condition is detected at step 600, then at step 610 the requester element issues a combined write and CMO request to a recipient element. At step 615, the recipient element processes the write operation and the CMO as separate operations, but can initiate processing of the CMO without awaiting completion of the write operation. The CMO can hence be completed even before the write data has been received/processed by the recipient element. Further, the CMO can potentially complete even before the completion signal is issued in respect of the write operation, provided the recipient element has set up appropriate hazard checking to ensure that when the write data is subsequently written it does not get allocated into the recipient's local cache in a way that conflicts with the performance of the cache maintenance operation.

Figure 9:
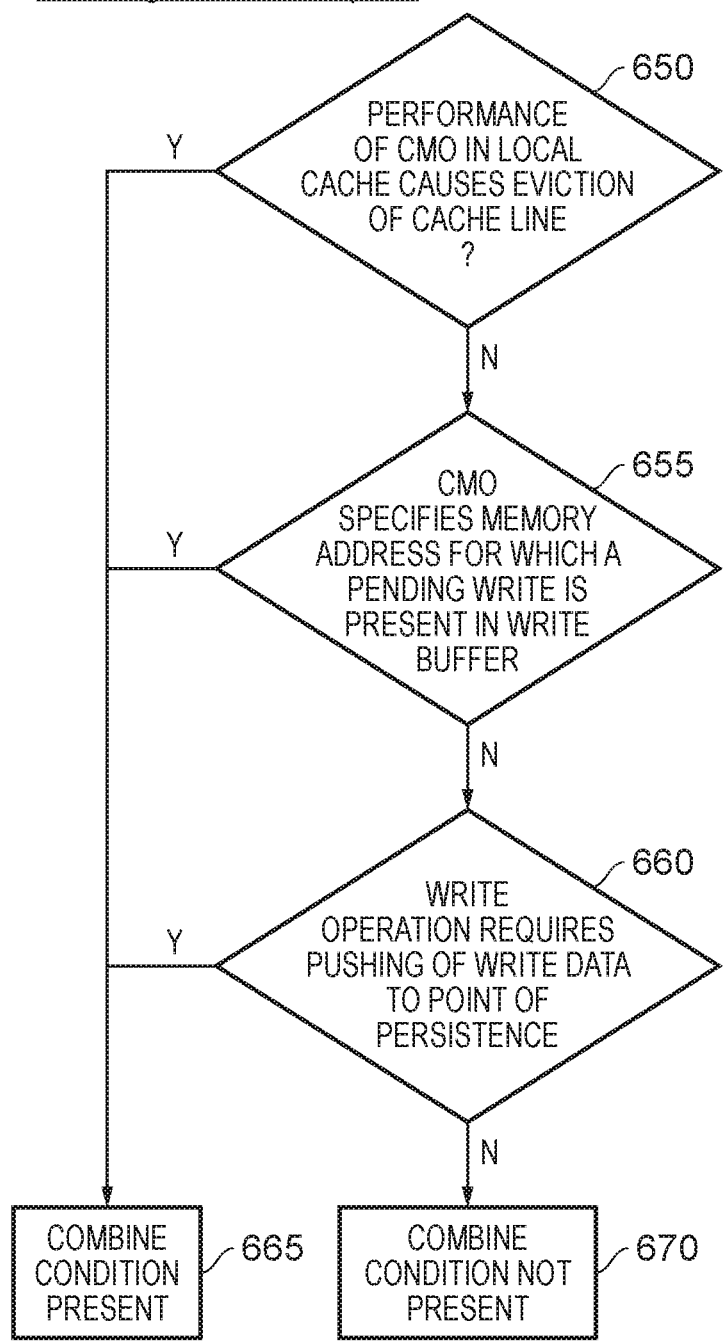
FIG. 9 is a flow diagram illustrating steps that may be performed in order to determine whether a condition for creating a combined write and cache maintenance operation request is present, in accordance with a specific implementation.

The condition may be detected at step 600 for a variety of reasons. FIG. 9 is a flow diagram illustrating a series of checks that might be performed in order to determine whether the condition exists. At step 650, it is determined whether performance of the CMO in a local cache of the requester element causes an eviction of a cache line. If it does, and the CMO needs to be propagated downstream from the requester element, then the process can proceed to step 665 where the combined condition is determined to be present and hence the requester element may issue a combined write and CMO request.

If the "no" path is followed from step 650, it may be determined whether the CMO specifies a memory address for which a pending write is present in a write buffer of the requester element. In that condition, it will be necessary to flush the pending write from the buffer in order to send the write request downstream, and again the process can proceed to step 665 where the combined condition is determined to be present.

If the "no" path is followed from step 655, then it may be determined at step 660 whether a write operation requires the pushing of data to a point of persistence. In this latter case, there may be no pending cache maintenance operation, but when it is determined that write data needs to be written to a point of persistence, it is typically the case that the write request itself cannot cause that to happen, and the write request needs to be followed by a persistent CMO request in order to cause the data to be pushed through to the point of persistence. In this case, again the process may proceed to step 665 where the combined condition is determined to be present.

If none of the checks performed at steps 650, 655, 660 cause the combined condition to be detected, then the process proceeds to step 670 where the combined condition is determined not to be present, and normal processing is performed as indicated by step 605 of FIG. 8.

The techniques described herein can be used in a variety of different systems. As one specific example use case, the combined write and CMO requests described herein may be used in systems using the Advanced Microcontroller Bus Architecture (AMBA) developed by Arm Limited, Cambridge, United Kingdom, and in particular in systems using the AMBA 5 CHI (Coherent Hub Interface) Architecture Specification. Various types of write operations and cache maintenance operations described in that architecture may be candidates for being handled using the combined write and CMO request mechanism described herein. For example, the technique could be adopted in association with certain CopyBack write operations (write operations typically generated by a cache) such as WriteBack and WriteClean operations, and in association with certain NonCopyBack write operations such as WriteNoSnp and WriteUnique operations. Such write operations may be allowed to be the subject of combined write and CMO requests for a variety of CMOs, such as a CleanShared(Persist) CMO (where cleaning of all cached copies (i.e. into the non dirty state) and writing back to memory (or PoP) of dirty data is required), and in some instances a CleanInvalid CMO (where all cached copies are invalidated, and writing back to memory of dirty data is required).

The techniques described herein enable a significant reduction in the latency of CMO completion by avoiding the need to serialise a CMO request behind a write request, and also enable a reduction in the bandwidth utilisation by enabling two requests to be combined into a single request.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a plurality of requester elements to issue requests;
at least one completer element to process the requests;
a cache hierarchy comprising a plurality of levels of cache to store cached copies of data associated with addresses in memory;
wherein:
a given requester element in the plurality of requester elements is arranged to issue a cache maintenance operation request specifying a memory address range in order to cause a block of data associated with the specified memory address range to be pushed through at least one level of the cache hierarchy to a determined visibility point in order to make that block of data visible to one or more other requester elements in the plurality of requester elements;
the given requester element is responsive to detection of a need to issue a write request prior to the cache maintenance operation request in order to cause a write operation to be performed in respect of an item of data within the specified memory address range, to generate a combined write and cache maintenance operation request to be issued instead of the write request and subsequent cache maintenance operation request;
wherein a recipient completer element amongst the at least one completer element that receives the combined write and cache maintenance operation request is arranged to start performing a cache maintenance operation required by the combined write and cache maintenance operation request without waiting for the write operation to complete.

2. An apparatus as claimed in claim 1, wherein:
the recipient completer element is arranged to issue a completion signal when processing a request specifying a memory address, to indicate that sufficient steps have been taken by the recipient completer element to ensure that an outcome of an operation required by that request will be observed by at least a subset of the plurality of requester elements that issue a subsequent request specifying that memory address to the recipient completer element; and
the recipient completer element is arranged to issue to the given requester element a write completion signal and a separate cache maintenance operation completion signal, to enable the given requester element to independently be appraised of progress of the write operation and the cache maintenance operation required by the combined write and cache maintenance operation request.

3. An apparatus as claimed in claim 2, wherein both the write completion signal and the separate cache maintenance operation completion signal use a same transaction identifier as specified in the combined write and cache maintenance operation request.

4. An apparatus as claimed in claim 1, wherein:
the recipient completer element is arranged to issue a plurality of signals during processing of the combined write and cache maintenance operation request; and
the combined write and cache maintenance operation request provides a target indication field used to determine a target element for each of the signals.

5. An apparatus as claimed in claim 4, wherein the target indication field indicates when a source element from which the recipient completer element is to obtain the item of data associated with the write operation is a different element to the given requester element that generated the combined write and cache maintenance operation request, and in that event the recipient completer element is arranged to issue a data pull signal directly to the different element to trigger the different element to transmit the item of data to the recipient completer element.

6. An apparatus as claimed in claim 5, wherein the different element is an element that issued an initial combined write and cache maintenance operation request to the given requester element, and processing of that initial combined write and cache maintenance operation request by the given requester element resulted in the given requester element issuing the combined write and cache maintenance operation request to the recipient completer element.

7. An apparatus as claimed in claim 6, wherein for at least one type of write operation, the apparatus is arranged to prohibit the obtaining of the item of data directly from the different element, and when the combined write and cache maintenance operation request relates to said at least one type of write operation, the target indication field is set to identify that the item of data is to be obtained from the given requester element.

8. An apparatus as claimed in claim 4, wherein the target indication field indicates when a target element for a first signal issued by the recipient completer element during processing of the write operation differs from a target element for a second signal issued by the recipient completer element during processing of the cache maintenance operation.

9. An apparatus as claimed in claim 8, wherein the determined visibility point is a point of persistence, the first signal is a data pull signal issued by the recipient completer element to seek to obtain the item of data, and the second signal is a persist signal issued to identify that the block of data associated with the specified memory address range has reached the point of persistence.

10. An apparatus as claimed in claim 4, wherein, at least when processing one of the write operation and the cache maintenance operation, the recipient completer element is arranged to combine multiple signals into a single combined signal when the multiple signals are to be issued to the same target element.

11. An apparatus as claimed in claim 10, wherein the recipient completer element is arranged to incorporate into the single combined signal at least one signal associated with the write operation and at least one signal associated with the cache maintenance operation.

12. An apparatus as claimed in claim 1, wherein:
the cache maintenance operation request identifies a cache maintenance operation that is also performed by the given requester element in respect of a given level of cache associated with the requester element, and the given requester element is arranged to detect the need to issue a write request prior to the cache maintenance operation request when performance of the cache maintenance operation in respect of the given level of cache requires the item of data to be evicted from that given level of cache.

13. An apparatus as claimed in claim 1, wherein the given requester element incorporates a buffer to hold pending write requests prior to issuance of those pending write requests from the given requester element, and the given requester element is arranged to detect the need to issue a write request prior to the cache maintenance operation request when a pending write request in the buffer is directed to an address within the specified memory address range for the cache maintenance operation request.

14. An apparatus as claimed in claim 1, wherein when the given requester element detects a need to write the item of data to a point of persistence, the given requester element is arranged to issue the combined write and cache maintenance operation request, so that performance of the cache maintenance operation will cause the item of data to be pushed to the point of persistence.

15. An apparatus as claimed in claim 1, wherein the given requester element is a master device used to generate transactions processed by interconnect circuitry incorporating the recipient completer element that receives the combined write and cache maintenance operation request issued by the master device.

16. An apparatus as claimed in claim 1, wherein the given requester element is an intermediate element within interconnect circuitry that both acts a completer element to perform the cache maintenance operation in response to a request from an upstream element and acts as the given requester element to issue the combined write and cache maintenance operation request to a downstream completer element.

17. An apparatus as claimed in claim 16, wherein the request from the upstream element also takes the form of the combined write and cache maintenance operation request.

18. An apparatus as claimed in claim 1, wherein when processing the combined write and cache maintenance operation request, the recipient completer element is responsive to determining that the item of data needs to be propagated on to a downstream element, to determine whether the cache maintenance operation also needs to be performed by the downstream element.

19. An apparatus as claimed in claim 18, wherein, on determining that the cache maintenance operation also needs to be performed by the downstream element, the recipient completer element is arranged to issue one of:
a further combined write and cache maintenance operation request to the downstream element;
a write request to the downstream element followed by a subsequent cache maintenance operation request to the downstream element.

20. A method of handling cache maintenance operations within an apparatus, comprising:
providing a plurality of requester elements to issue requests, at least one completer element to process the requests, and a cache hierarchy comprising a plurality of levels of cache to store cached copies of data associated with addresses in memory;
arranging a given requester element to issue a cache maintenance operation request specifying a memory address range in order to cause a block of data associated with the specified memory address range to be pushed through at least one level of the cache hierarchy to a determined visibility point in order to make that block of data visible to one or more other requester elements in the plurality of requester elements;
in response to detecting a need to issue a write request prior to the cache maintenance operation request in order to cause a write operation to be performed in respect of an item of data within the specified memory address range, generating at the given requester element a combined write and cache maintenance operation request to be issued instead of the write request and subsequent cache maintenance operation request; and
causing a recipient completer element amongst the at least one completer element that receives the combined write and cache maintenance operation request to start performing a cache maintenance operation required by the combined write and cache maintenance operation request without waiting for the write operation to complete.

21. An apparatus comprising:
a plurality of requester element means for issuing requests;
at least one completer element means for processing the requests;
a cache hierarchy comprising a plurality of levels of cache means for storing cached copies of data associated with addresses in memory;
wherein:
a given requester element means in the plurality of requester element means is arranged to issue a cache maintenance operation request specifying a memory address range in order to cause a block of data associated with the specified memory address range to be pushed through at least one level of the cache hierarchy to a determined visibility point in order to make that block of data visible to one or more other requester element means in the plurality of requester element means;
the given requester element means, responsive to detection of a need to issue a write request prior to the cache maintenance operation request in order to cause a write operation to be performed in respect of an item of data within the specified memory address range, for generating a combined write and cache maintenance operation request to be issued instead of the write request and subsequent cache maintenance operation request;
wherein a recipient completer element means amongst the at least one completer element means that receives the combined write and cache maintenance operation request is arranged to start performing a cache maintenance operation required by the combined write and cache maintenance operation request without waiting for the write operation to complete.

* * * * *